United States Patent
Schreiber et al.

(10) Patent No.: US 6,533,549 B1
(45) Date of Patent: Mar. 18, 2003

(54) HELICOPTER

(75) Inventors: Thomas Schreiber, Zorneding (DE);
Carsten Wintjen, Grebenstein (DE);
Torsten Röhn, Felsberg (DE)

(73) Assignee: ZF Luftfahrttechnik GmbH, Calden (DE)

( * ) Notice: Subject to any disclaimer, the term of this patent is extended or adjusted under 35 U.S.C. 154(b) by 0 days.

(21) Appl. No.: 09/936,008

(22) PCT Filed: Apr. 3, 2000

(86) PCT No.: PCT/EP00/01922
§ 371 (c)(1),
(2), (4) Date: Jun. 9, 2001

(87) PCT Pub. No.: WO00/53491
PCT Pub. Date: Sep. 14, 2000

(30) Foreign Application Priority Data

Mar. 10, 1999  (DE) .......................................... 199 10 449

(51) Int. Cl.[7] .............................................. B63H 3/00
(52) U.S. Cl. ...................................... 416/114; 416/155
(58) Field of Search ................. 416/163, 164, 416/168 R, 155, 114; 244/17.21, 17.25, 220, 221

(56) References Cited

U.S. PATENT DOCUMENTS

| 3,080,002 A |   | 3/1963  | de Pont ............... 170/160.26 |
|-------------|---|---------|-----------------------------------|
| 3,464,651 A | * | 9/1969  | Lightfoot ................. 244/17.25 |
| 3,520,636 A |   | 7/1970  | Spanger ..................... 416/112 |
| 3,924,965 A | * | 12/1975 | Lemont ..................... 416/114 |
| 4,375,940 A |   | 3/1983  | Lovera et al. .............. 416/114 |
| 4,805,850 A |   | 2/1989  | Flux et al. ................. 416/163 |
| 4,958,786 A | * | 9/1990  | Ogawa et al. ............ 244/17.13 |
| 5,826,822 A |   | 10/1998 | Rehm ....................... 416/114 |
| 6,152,696 A | * | 11/2000 | Rampal .................... 416/114 |

FOREIGN PATENT DOCUMENTS

| CH | 443 007       | 1/1968  | ........... B64C/26/01 |
|----|---------------|---------|------------------------|
| DE | 29 41 258     | 4/1980  | ........... B64C/27/72 |
| DE | 30 02 470     | 9/1980  | ........... B64C/27/74 |
| DE | 36 03 400 C1  | 5/1987  | ........... B64C/27/54 |
| DE | 36 39 168 A1  | 5/1987  | ........... B64C/27/59 |
| DE | 36 20 794 A1  | 12/1987 | ......... B64C/27/605 |
| DE | 195 46 929 A1 | 6/1997  | ......... B64C/27/605 |
| DE | 196 18 810 A1 | 11/1997 | ......... B64C/27/605 |
| DE | 196 27 869 A1 | 1/1998  | ......... B64C/27/605 |
| FR | 1.163.970     | 10/1958 |                        |

OTHER PUBLICATIONS

Richter, Peter and Hans–Dieter Eisbrecher, "Entwicklung und erste Tests von Aktuatoren für eine Einzelblattsteuerung" Paper No. III.6.3.1, Sixteenth European Rotorcraft Forum, Glascow, Scotland Sep. 18–21, 1990, pp. 11.

* cited by examiner

Primary Examiner—Ninh H. Nguyen
(74) Attorney, Agent, or Firm—Davis & Bujold, P.L.L.C.

(57) ABSTRACT

A helicopter with rotor blades rotatably connected to a rotor head. The rotor head is non-rotatably connected with a rotor mast (1) pivoted in a transmission housing and driven by a transmission via at least one driving mechanism. A pitch of the rotor blades, relative to a plane of rotation of the rotor blades, is controlled via a swash plate, control rods (12) and via individual actuators (9) allocated to each individual rotor blade. The control rods (12) and the actuators (9) are mounted in the rotor mast (1) and the rotor head and those components act, via a mixing lever (11) and a control rod (8), upon a pivoted arm (7) which adjusts the pitch of the rotor blade. The control devices of the rotor blades do not interfere with the air flow, are affected only to a limited extent by centrifugal forces and additional stresses, and are also protected against influences of the weather.

19 Claims, 1 Drawing Sheet

HELICOPTER

BACKGROUND OF THE INVENTION

The core part of a helicopter is its main rotor. One or more driving mechanisms actuate the main rotor via a transmission and a rotor mast pivotally supported in the housing of the transmission and on which the rotor head is fastened.

The main rotor, with its two and more rotor blades which around their longitudinal axis are adjustably connected with the rotor head, takes care not only for the lift but also for the propulsion. Flapping hinges, drag links, elastomer bearings, or torsional bars serve to hinge the rotor blades on the rotor head. To produce a lift, the rotor blades are collectively or synchronously adjusted around an angle formed with the plane of rotation. A propulsion is obtained by the cyclic control, that is, the angle of incidence of a rotor blade during one revolution of the rotor mast runs through a maximum and a minimum. The direction of flight determines the position of the extreme values.

The pilot of the helicopter controls the rotor blades via a swash plate or spider. A swash plate consists of one stationary part which, via a so-called fork, is fastened on the housing of a transmission in a non-rotatable, but axially, displaceable manner and tiltably in all directions relative to the rotor mast, and of a rotational part pivoted, via radial and axial bearings, against the stationary part. The rotatable part moves with the stationary part in the axial direction, performing at the same time tilting motions. It is fastened on the rotor head via one other fork.

The movement of the swash plate is transmitted via a lever mechanism to rotor blade holding fixtures on the rotor head and this mostly in a manner such that the angle of incidence of a rotor blade enlarges approximately with the angle of the swash plate to the rotor head.

The helicopter pilot adjusts the swash plate for the flying maneuvers via another lever mechanism. Parallel to the latter servomotors are often disposed which, on one hand, facilitate the control and, on the other, make possible superposed control that counteracts rotor blade forces that appear.

The available maximum speed of helicopters is limited by rotor induced oscillations and by the degree of effectiveness of the forward flying main rotor. Oscillations and degree of effectiveness and determined by not optimal angles of incidence of the rotor blades relative to the momentary direction and speed of the blower stream and of the dynamic behavior. To counteract the effects, it is more flexibly advantageous to control the angle of incidence of the blade. Flutters resulting from broken flow on the rotor blades can be controlled, for example, by interference suppressing regulators with the aid of band filters for the first torsion inherent frequency of the rotor blades. Noise and vibrations are reduced thereby and the degree of effectiveness, the same as the economy, are improved. In addition the pilot's work load is reduced.

Two active control systems are basically known (paper No. III.6.3.1, Sixteenth European Rotorcraft Forum, Sept. $18^{th}$ to $21^{st}$ 1990, Glasglow "Development and First Tests of Actuators for Single-Blade Control", Peter Richter, Hans-Dieter Eisbrecher, Valentin Kloeppel), namely, the higher harmonic control superposed on the control of the swash plate and whose actuators are arranged below the swash plate in the helicopter fixed system and the single blade control where, with each rotor blade, one actuator is associated in the rotary system between the rotatable part of the swash plate and the rotor blade holding fixtures.

In the higher harmonic control, highly frequent blade angle changes are transmitted via the swash plate to the rotor blades by actuators in the helicopter fixed system. For reasons of geometry, only certain frequencies can be transmitted thereby, namely, the so-called blade number harmonics and the immediately adjoining frequencies wherefore in a four-blade rotor the fourth, third, and fifth, the eighth, seventh and ninth, etc. harmonics of the rotor rotary frequency but not the second, sixth or tenth harmonics. The same applies to rotors having more than four blades.

In the single-blade control, there are no limitations as to the frequencies and signal shape, but production cost for the actuators in the rotary system is considerably greater on account of the additional centrifugal force loads and the energy and signal transmission from the helicopter fixed system to the rotary system. Besides, the possibility of individually controlling each actuator involves the danger that the rotor blades move at random in case of malfunction of the control system, which impairs the safety.

From DE 196 27 860 A1 are also known mixed systems in which one swash plate interacts with one or more individual hydraulic actuators between the swash plate and the rotor blades. The actuators lie outside the mast and the rotor head and are exposed to environmental influences. Furthermore, the centrifugal forces of the actuators lying in the load train load the control system. It is also possible that two swash plates interact with each other.

It is further known from U.S. Pat. No. 3,080,002 that a swash plate is situated in the closed rotor head and adjusting systems lead to the swash plate through the rotor mast or a supporting column coaxially situated therein and fixedly connected with a transmission housing. Thereby the swash plate and the control rods for the rotor blades are protected by the rotor mast and the rotor head without impairing the air flow. Additional hydraulic actuators are not provided.

DE 36 39 168 C2 shows a similar solution in which control rods are guided through an annular space between a supporting column and the rotor mast.

The problem on which the invention is based is, in a helicopter of the above mentioned kind with an individual control of the rotor blades, to protect the control devices and accommodate them less loaded by foreign influences.

SUMMARY OF THE INVENTION

According to the invention, the control rods and the actuators are supported on the rotor mast and/or rotor head. They individual engage for each rotor blade in a maximum lever which acts via a control rod upon a pivoted arm and thus adjusts the pitch of the rotor blade. The actuators of the additional adjustment system are structurally bound in the rotary system or, according to one development, integrated therein so that they are exposed to no wind loads and their centrifugal forces, control, mass and added loads can, for the most part, be directly absorbed by the rotor mast or rotor head which is designed for much heavier loads. The total weight can be reduced by utilizing the structural frame conditions.

The actuation system of the actuators and control rods is coupled, via the mixing lever without added loads, the individual control portions being variable on the mixing lever by the distances from each other of the pivoting axles. It is, in addition, convenient that the control rod engages on a mixing lever between the pivoting axle of the control rod and the pivoting axle of the actuator on a pivoting axle. It is advantageous here that the distance of the pivoting axle of the control rod to the pivoting axle of the control rods be smaller than the distance to the pivoting axle of the actuator. These features make electrically or hydraulically tuning possible and optimizing the controlling force and regulating distance as the adjustment principle selected requires.

According to one development of the invention, the control rod is adjustable in length so that the zero position of the pitch of the rotor blades be easily set. Alternatively to this, it is possible to provide between the shaft and the rotor blade an element of adjustable rotation to make possible the adjustment of the angle of incidence. Besides, it is convenient that the longitudinal axles of the actuators and of the control rods extend parallel to the axis of rotation of the rotor mast so that the centrifugal forces have no effect on the adjusting movement. Besides, the actuators fastened on the rotary system can be easily supplied by lines along the walls of the rotor mast.

Since the control elements, actuators and control rods and the swash plate are disposed within. the rotor mast or the rotor head or within a transmission, the eventually available lubricants and hydraulic fluids can be used for them. Furthermore, they are lodged in a space protected against erosion and corrosion.

In the specification and in the claims are described numerous features in association. The expert conveniently will also separately observe the combined features, according to the problem to be solved, and make logical added combinations with them.

BRIEF DESCRIPTION OF THE DRAWING

The invention will now be described, by way of example, with reference to the accompanying drawing in which.

DETAILED DESCRIPTION OF THE INVENTION

Figure 1:
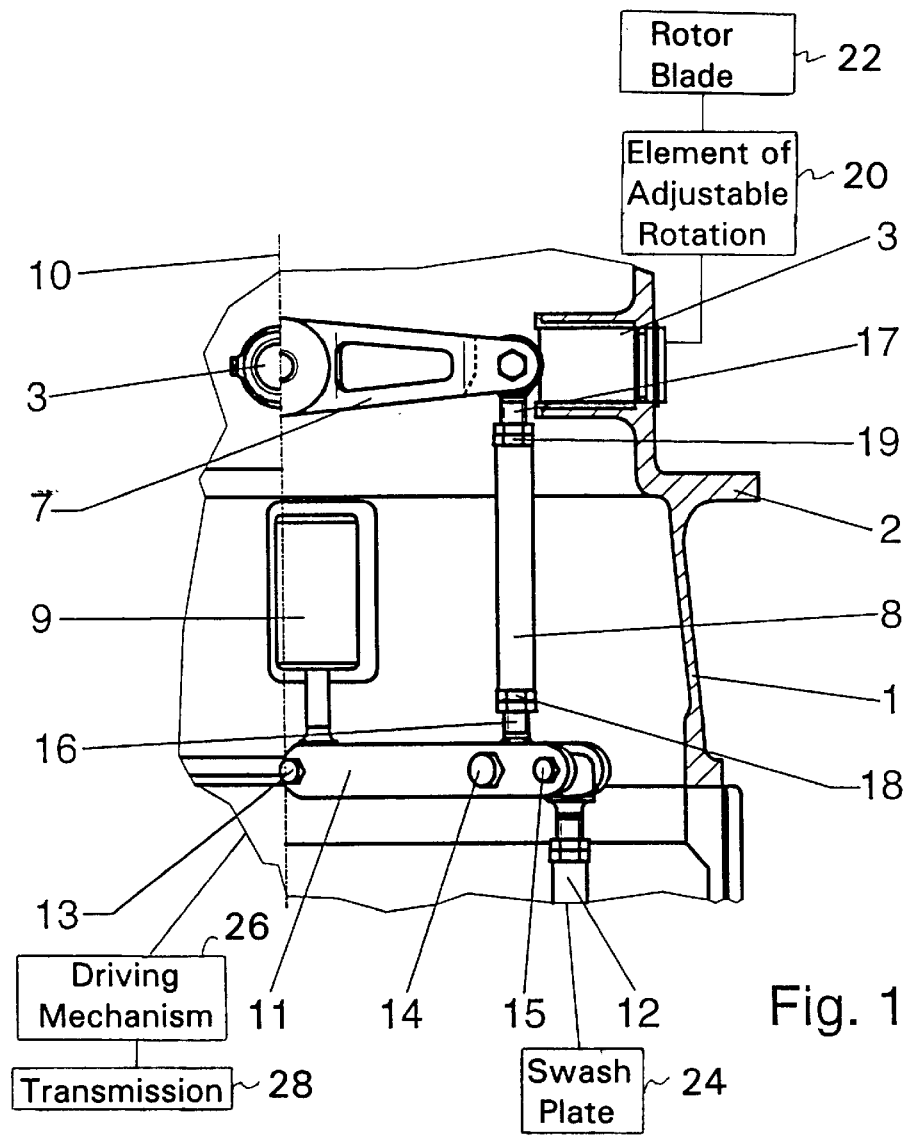
FIG. 1 is a diagrammatic partial section through a rotor mast of a helicopter.
Figure 2:
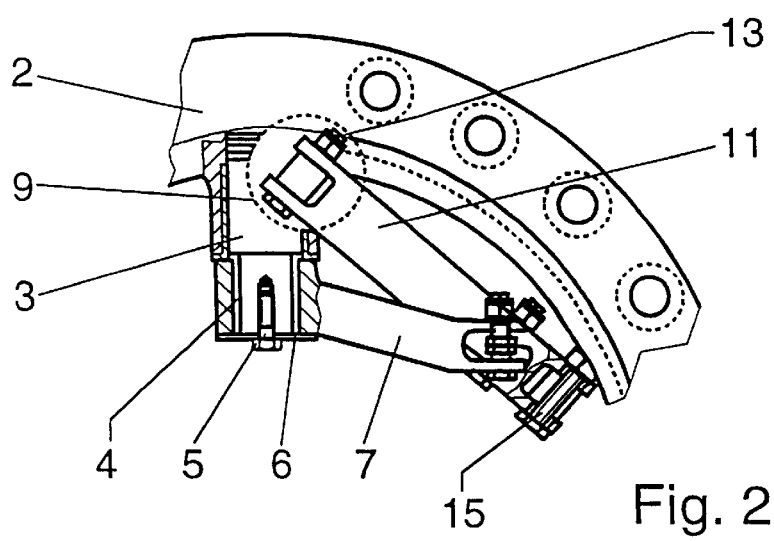
FIG. 2 is a partial view from above.

One rotor mast 1 is pivotally supported around an axis of rotation 10 in a transmission housing (not shown in detail). It is driven via the transmission by one or two driving mechanisms (likewise not shown). In the rotor mast 1, which can be connected via a flange 2 with other rotating parts, one pivoted arm 7, also called a control arm, is provided for each rotor blade to adjust the pitch. The pivoted arm 7 is connected with positive fit with a shaft 3 via a plug-in gearing 4 and is axially retained by means of a screw 5 and a disk 6. The shaft 3 is supported pivotally in the rotor mast 1 (FIG. 2).

On the free end of the pivoted arm 7 is hinged a control rod 8 which engages via an articulation axle 14 in a mixing lever 11. The control rod 8 extends substantially parallel to the axis of rotation 10. The length thereof is adjustable. For the purpose serve on their ends set screws 16, 17 which are fixed in their position by lock nuts 18, 19.

While the articulation axle 14 of the control rod 8 is disposed between the ends of the mixing lever 11, on the ends of the mixing lever 11 are provided one articulation axle 13 for an actuator 9 and one articulation axle 15 for control rods 12. The latter is connected with the rotating part of a swash plate (not shown in detail).

The helicopter has a rotor head with pivotal rotor blades 22 connected thereto. The rotor head is connected for rotation with a rotor mast 1 mounted to a transmission housing and driven by a transmission 28 via at least one driving mechanism 26. The pitch of the rotor blades 22, relative to a plane of rotation of the rotor blades 22, is controlled by a swash plate 24, a plurality of first control rods 12 and a plurality of actuators 9 associated with the rotor blades 22. These first control rods 12 and the actuators 9 are each supported by the rotor mast 1. Each rotor blade 22 is coupled to a pivoted lever 7, and a mixing lever 11 and a second control rod 8. Each of the of the pivoted levers 7 is coupled to one of the plurality of actuators 9 to adjust of the pitch of the rotor blades 22. The pivot levers 7 are also coupled to a shaft 3 which is coupled to one of the rotor blades 22. An adjustable rotation element 20 is located between the shaft 3 and the rotor blade coupled to the shaft 3.

REFERENCE NUMERALS 1 rotor mast
2 flange
3 shaft
4 plug-in toothing
5 screw
6 disk
7 pivoted arm
8 control rod
9 actuator
10 axis of rotation
11 mixing lever
12 control rods
13 articulation axle (actuator)
14 articulation axle (control rod)
15 articulation axle (control rods)
16 set screw
17 set screw
18 lock nut
19 lock nut

What is claimed is:

1. A helicopter having a rotor head with pivotal rotor blades connected thereto, the rotor head is connected for rotation with a rotor mast (1) mounted to a transmission housing and driven by a transmission via at least one driving mechanism, and a pitch of the rotor blades, relative to a plane of rotation of the rotor blades, is controlled by a swash plate, a plurality of first control rods (12) and a plurality of actuators (9) associated with the rotor blades;

wherein the plurality of first control rods (12) and the actuators (9) are each supported by and rotate with the rotor mast (1), each rotor blade is coupled to a pivoted lever (7), and a mixing lever (11) and a second control rod (8) couple each one of the pivoted levers (7) to one of the plurality of actuator (9) to facilitate adjustment of the pitch of the rotor blades.

2. The helicopter according to claim 1, wherein the plurality of actuators (9) are integrated in the rotor mast (1).

3. The helicopter according to claim 1, wherein each one of the plurality of actuators (9) is associated with only one of the rotor blades.

4. The helicopter according to claim 1, wherein each second control rod (8) has an adjustable length.

5. The helicopter according to claim 1, wherein each of the pivoted levers (7) is coupled to a shaft (3) coupled to one of the rotor blades, and an adjustable rotation element is provided between the shaft (3) and the rotor blade coupled to the shaft (3).

6. The helicopter according to claim 1, wherein, for each actuator, a first articulation axle (13) couples the actuator (9) to the mixing lever (11), a second articulation axle (14) couples the second control rod (8) to the mixing lever (11), a third articulation axle (15) couples one of the plurality of first control rods (12) to the mixing lever (11), and the second articulation axle (14) is located closer to the third articulation axle (15) than to the second articulation axle (13).

7. The helicopter according to claim 1, wherein a longitudinal axis for each actuator (9), a longitudinal axis for each of the first and second control rods (8, 12) extends substantially parallel to a rotational axis (10) of the rotor mast (1).

8. A helicopter having a rotor head with pivotal rotor blades connected thereto, the rotor head is connected for rotation with a rotor mast (1) mounted to a transmission housing and driven by a transmission via at least one driving mechanism, and a pitch of the rotor blades, relative to a plane of rotation of the rotor blades, is controlled by a swash plate, a plurality of first control rods (12) and a plurality of actuators (9) associated with the rotor blades;

wherein the plurality of first control rods (12) and the actuators (9) are each supported by and rotate with the rotor mast (1), each rotor blade is coupled to a pivoted lever (7), and a mixing lever (11) and a second control rod (8) couple each one of the pivoted levers (7) to one of the plurality of actuator (9) to facilitate adjustment of the pitch of the rotor blades; and a first articulation axle (13) couples the actuator (9) to the mixing lever (11), a third articulation axle (15) couples one of the plurality of first control rods (12) to the mixing lever (11), and the second control rod (8) is coupled to the mixing lever (11) by a second articulation axle (14) located between the first and third articulation axles (13, 15).

9. The helicopter according to claim 8, wherein the plurality of actuators (9) are integrated in the rotor mast (1).

10. The helicopter according to claim 8, wherein each one of the plurality of actuators (9) is associated with only one of the rotor blades.

11. The helicopter according to claim 8, wherein each second control rod (8) has an adjustable length.

12. The helicopter according to claim 8, wherein each of the pivoted levers (7) is coupled to a shaft (3) coupled to one of the rotor blades, and an adjustable rotation element is provided between the shaft (3) and the rotor blade coupled to the shaft (3).

13. The helicopter according to claim 8, wherein, for each actuator, a first articulation axle (13) couples the actuator (9) to the mixing lever (11), a second articulation axle (14) couples the second control rod (8) to the mixing lever (11), a third articulation axle (15) couples one of the plurality of first control rods (12) to the mixing lever (11), and the second articulation axle (14) is located closer to the third articulation axle (15) than to the second articulation axle (13).

14. A helicopter having a rotor head with pivotal rotor blades connected thereto, the rotor head is connected for rotation with a rotor mast (1) mounted to a transmission housing and driven by a transmission via at least one driving mechanism, and a pitch of the rotor blades, relative to a plane of rotation of the rotor blades, is controlled by a swash plate, a plurality of first control rods (12) and a plurality of actuators (9) associated with the rotor blades;

wherein the plurality of first control rods (12) and the actuators (9) are each supported by and rotate with the rotor mast (1), each rotor blade is coupled to a pivoted lever (7), and a mixing lever (11) and a second control rod (8) couple each one of the pivoted levers (7) to one of the plurality of actuator (9) to facilitate adjustment of the pitch of the rotor blades; and a longitudinal axis for each of the plurality of actuators (9) extends substantially parallel to a rotational axis (10) of the rotor mast (1).

15. The helicopter according to claim 14, wherein the plurality of actuators (9) are integrated in the rotor mast (1).

16. The helicopter according to claim 14, wherein each one of the plurality of actuators (9) is associated with only one of the rotor blades.

17. The helicopter according to claim 14, wherein each second control rod (8) has an adjustable length.

18. The helicopter according to claim 14, wherein each of the pivoted levers (7) is coupled to a shaft (3) coupled to one of the rotor blades, and an adjustable rotation element is provided between the shaft (3) and the rotor blade coupled to the shaft (3).

19. The helicopter according to claim 14, wherein, for each actuator, a first articulation axle (13) couples the actuator (9) to the mixing lever (11), a second articulation axle (14) couples the second control rod (8) to the mixing lever (11), a third articulation axle (15) couples one of the plurality of first control rods (12) to the mixing lever (11), and the second articulation axle (14) is located closer to the third articulation axle (15) than to the second articulation axle (13).

* * * * *